US007299492B2

(12) United States Patent
Thrash et al.

(10) Patent No.: US 7,299,492 B2
(45) Date of Patent: Nov. 20, 2007

(54) MULTI-LEVEL MULTI-USER WEB SERVICES SECURITY SYSTEM AND METHOD

(75) Inventors: Ralph W. Thrash, Knoxville, MD (US); Dennis P. McGrath, Washington, DC (US); Anthony M. Paper, Fairfax, VA (US); Siddharth N. Purohit, Edison, NJ (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 10/459,794

(22) Filed: Jun. 12, 2003

(65) Prior Publication Data

US 2005/0015591 A1 Jan. 20, 2005

(51) Int. Cl.
*H04L 9/00* (2006.01)
*H04K 1/00* (2006.01)
*G06F 21/00* (2006.01)

(52) U.S. Cl. .............................. 726/5; 726/1; 713/156

(58) Field of Classification Search ..................... None
See application file for complete search history.

(56) References Cited

U.S. PATENT DOCUMENTS 5,535,276 A * 7/1996 Ganesan ..................... 713/155
5,590,199 A * 12/1996 Krajewski et al. .......... 713/159
5,737,419 A * 4/1998 Ganesan ..................... 713/169
5,748,735 A * 5/1998 Ganesan ..................... 713/165
5,944,824 A * 8/1999 He ................................ 726/6
6,081,900 A 6/2000 Subramaniam et al.
6,098,058 A 8/2000 Gravell et al.
6,158,010 A 12/2000 Moriconi et al.
6,308,238 B1 10/2001 Smith et al.
6,345,299 B2 2/2002 Segal
6,360,254 B1 3/2002 Linden et al.
6,363,478 B1 3/2002 Lambert et al.
6,421,782 B1 7/2002 Yanagisawa et al.
7,024,692 B1 * 4/2006 Schanze et al. ............... 726/10
7,065,574 B1 * 6/2006 Saulpaugh et al. ......... 709/225

(Continued)

FOREIGN PATENT DOCUMENTS

FR 2799077 A1 3/2001

OTHER PUBLICATIONS

Boyer, "Canonical XML Version 1.0", Mar. 2001, Network Working Group Request for Comments, RFC 3076, p. 1-28.*

(Continued)

*Primary Examiner*—Christopher Revak
(74) *Attorney, Agent, or Firm*—Douglas A. Lashmit; Hoffman, Warnick & D'Alessandro LLC

(57) ABSTRACT

A security system and method for granting multi-level access to data items in a distributed network. An architecture is provided, comprising: an authentication server that provides access to a web portal using a web services based communication framework; a system for securely establishing security credentials for an end user logging into the authentication server system; an access directory that obtains the security credentials for the end user from the authentication server, generates a set of XML credential data based on a predefined XML schema, and returns the XML credential data to the authentication server; and wherein the authentication server passes the XML credential data to the web portal in order to grant access to the end user for data items accessible via the web portal.

26 Claims, 32 Drawing Sheets

U.S. PATENT DOCUMENTS

| | | | | |
|---|---|---|---|---|
| 7,072,967 | B1* | 7/2006 | Saulpaugh et al. | 709/229 |
| 2001/0007133 | A1 | 7/2001 | Moriconi et al. | |
| 2001/0044893 | A1 | 11/2001 | Skemer | |
| 2002/0046352 | A1 | 4/2002 | Ludwig | |
| 2002/0099936 | A1 | 7/2002 | Kou et al. | |
| 2002/0108059 | A1 | 8/2002 | Canion et al. | |
| 2002/0112153 | A1 | 8/2002 | Wu et al. | |
| 2002/0116644 | A1 | 8/2002 | Richard | |
| 2004/0054898 | A1* | 3/2004 | Chao et al. | 713/168 |
| 2004/0139319 | A1* | 7/2004 | Favazza et al. | 713/168 |
| 2005/0044197 | A1* | 2/2005 | Lai | 709/223 |
| 2005/0149729 | A1* | 7/2005 | Zimmer et al. | 713/168 |
| 2006/0129935 | A1* | 6/2006 | Deinlein et al. | 715/733 |
| 2006/0136992 | A1* | 6/2006 | Shigeeda | 726/2 |

OTHER PUBLICATIONS

O'Tuathail et al, "Using the Simple Object Access Protocol (SOAP) in Blocks Extensible Exchange Protocol (BEEP)", Jun. 2002, Network Working Group Request for Comments, RFC 3288, p. 1-20.*

Polivy et al, "Authenticating Distributed Data Using Web Services and XML Signatures", Nov. 22, 2002, ACM Workshop on XML Security, p. 80-89.*

Park et al, "Certificate Validation Service using XKMS for Computational Grid", 2003, ACM Workshop on XML Security, p. 112-120.*

* cited by examiner

ELEMENTS areaOfInterest
businessServices
caveat
caveats
city
cityOfInterest
coiName
coiNetworkType
coiProfile
coiStatus
coiType
countryCode
countryName
countryOfInterest
dm1Int
dm1Item
dm1List
dmInt
dmItem
dmList
domain1TypeOfInterest
domainTypeOfInterest
geoInt
geoItem
geoList
goal
homePage
interestsProfile
item
items
leader
level
lowerLeftLocation
memberItem
memberList
mission
objectId
objective
objectName
objectOfInterest
orgId
orgName
politicalRegionOfInterest
priority
regionOfInterest
relationshipProfile
requestItem
requestList
role
roleName
roles
scaleOfInterest
securityProfile
service
sourceProfile
sponsor
startDate
stopDate
topicName
topicOfInterest
upperRightLocation
uuid

*FIG. 2* element areaOfInterest

| | |
|---|---|
| diagram | 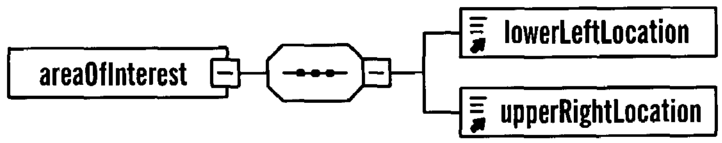 |
| children | lowerLeftLocation upperRightLocation |
| used by | element item |
| source | <xs:element name="areaOfInterest"> <xs:complexType> <xs:sequence> <xs:element ref="lowerLeftLocation"/> <xs:element ref="upperRightLocation"/> </xs:sequence> </xs:complexType></xs:element> |

element businessServices

| | |
|---|---|
| diagram | 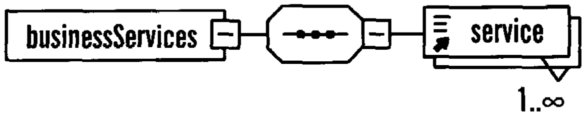 |
| children | service |
| used by | element role |
| source | <xs:element name="businessServices"> <xs:complexType> <xs:sequence> <xs:element ref="service" maxOccurs="unbounded"/> </xs:sequence> </xs:complexType></xs:element> |

*FIG. 3A* element caveat

| | |
|---|---|
| diagram |  |
| type | restriction of xs:string |
| used by | element caveats |
| facets | enumeration C1<br>enumeration C2<br>enumeration C3<br>enumeration R1<br>enumeration R2<br>enumeration R3 |
| source | <xs:element name="caveat"> <xs:simpleType> <xs:restriction base="xs:string"> <xs:enumeration value="C1"/><br><xs:enumeration value="C2"/> <xs:enumeration value="C3"/> <xs:enumeration value="R1"/><br><xs:enumeration value="R2"/> <xs:enumeration value="R3"/> </xs:restriction> </xs:simpleType></xs:element> |

element caveats

| | |
|---|---|
| diagram | 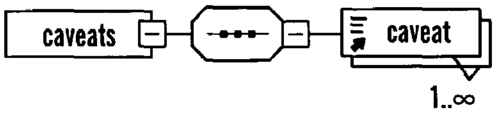 |
| children | caveat |
| used by | element securityProfile |
| source | <xs:element name="caveats"> <xs:complexType> <xs:sequence><br><xs:element ref="caveat" maxOccurs="unbounded"/> </xs:sequence> </xs:complexType></xs:element> |

*FIG. 3B* element city

| | |
|---|---|
| diagram |  |
| type | restriction of xs:string |
| used by | element cityOfInterest |
| facets | enumeration City1<br>enumeration City2 |
| source | <xs:element name="city"> <xs:simpleType> <xs:restriction base="xs:string"> <xs:enumeration value="City1"/> <xs:enumeration value="City2"/> </xs:restriction> </xs:simpleType></xs:element> |

element cityOfInterest

| | |
|---|---|
| diagram | 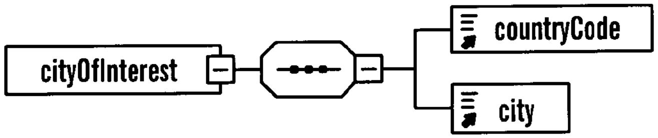 |
| children | countryCode city |
| used by | element item |
| source | <xs:element name="cityOfInterest"> <xs:complexType> <xs:sequence> <xs:element ref="countryCode"/> <xs:element ref="city"/> </xs:sequence> </xs:complexType></xs:element> |

*FIG. 4A* element coiName

| | |
|---|---|
| diagram | ≡ coiName |
| type | xs:string |
| used by | element coiProfile |
| source | <xs:element name="coiName" type="xs:string"/> | element coiNetworkType

| | |
|---|---|
| diagram | ≡ coiNetworkType |
| type | xs:string |
| used by | element coiProfile |
| source | <xs:element name="coiNetworkType" type="xs:string"/> |

FIG. 4B element coiProfile diagram

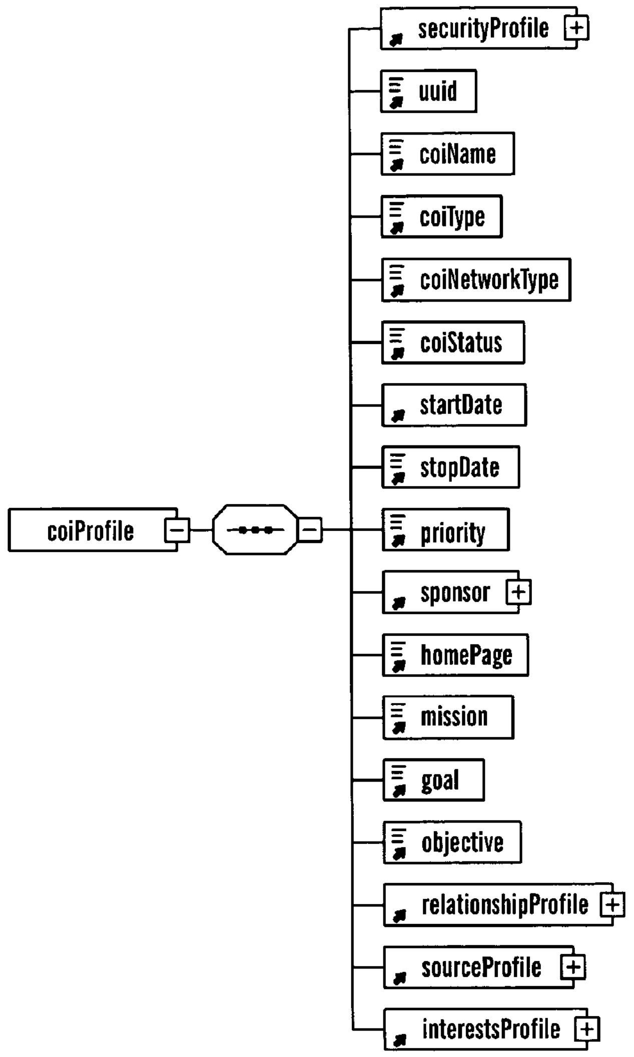

| | |
|---|---|
| children | securityProfile uuid coiName coiType coiNetworkType coiStatus startDate stopDate priority sponsor homePage mission goal objective relationshipProfile sourceProfile interestsProfile |
| source | <xs:element name="coiProfile"> <xs:complexType> <xs:sequence> <xs:element ref="securityProfile"/> <xs:element ref="uuid"/> <xs:element ref="coiName"/> <xs:element ref="coiType"/> <xs:element ref="coiNetworkType"/> <xs:element ref="coiStatus"/> <xs:element ref="startDate"/> <xs:element ref="stopDate"/> <xs:element ref="priority"/> <xs:element ref="sponsor"/> <xs:element ref="homePage"/> <xs:element ref="mission"/> <xs:element ref="goal"/> <xs:element ref="objective"/> <xs:element ref="relationshipProfile"/> <xs:element ref="sourceProfile"/> <xs:element ref="interestsProfile"/> </xs:sequence> </xs:complexType> </xs:element> |

*FIG. 5* element coiStatus

| | |
|---|---|
| diagram | coiStatus |
| type | xs:string |
| used by | element coiProfile |
| source | <xs:element name="coiStatus" type="xs:string"/> |

element coiType

| | |
|---|---|
| diagram | coiType |
| type | xs:string |
| used by | element coiProfile |
| source | <xs:element name="coiType" type="xs:string"/> |

element countryCode

| | |
|---|---|
| diagram | countryCode |
| type | restriction of xs:string |
| used by | elements cityOfInterest countryOfInterest |
| facets | enumeration UK<br>enumeration US |
| source | <xs:element name="countryCode"> <xs:simpleType> <xs:restriction base="xs:string"> <xs:enumeration value="UK"/><br><xs:enumeration value="US"/> </xs:restriction> </xs:simpleType></xs:element> |

*FIG. 6A* element countryName

| | |
|---|---|
| diagram |  |
| type | xs:string |
| used by | element countryOfInterest |
| source | <xs:element name="countryName" type="xs:string"/> |

element countryOfInterest

| | |
|---|---|
| diagram | 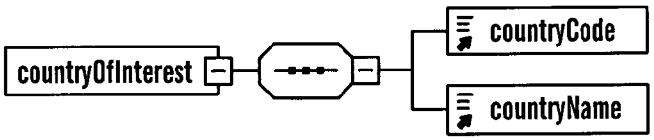 |
| children | countryCode countryName |
| used by | element item |
| source | <xs:element name="countryOfInterest"> <xs:complexType> <xs:sequence> <xs:element ref="countryCode"/> <xs:element ref="countryName"/> </xs:sequence> </xs:complexType> </xs:element> |

FIG. 6B element dm1Int

| | |
|---|---|
| diagram | 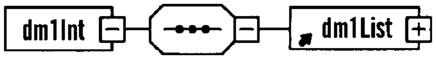 |
| children | dm1List |
| used by | element sourceProfile |
| source | <xs:element name="dm1Int"> <xs:complexType> <xs:sequence> <xs:element ref="dm1List"/> </xs:sequence> </xs:complexType> </xs:element> |

element dm1Item

| | |
|---|---|
| diagram | 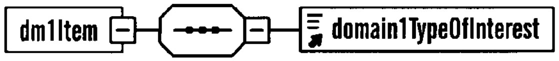 |
| children | domain1TypeOfInterest |
| used by | element dm1List |
| source | <xs:element name="dm1Item"> <xs:complexType> <xs:sequence> <xs:element ref="domain1TypeOfInterest"/> </xs:sequence> </xs:complexType> </xs:element> |

element dm1List

| | |
|---|---|
| diagram | 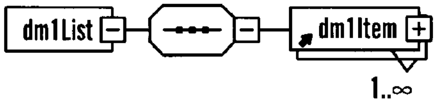 |
| children | dm1Item |
| used by | element dm1Int |
| source | <xs:element name="dm1List"> <xs:complexType> <xs:sequence> <xs:element ref="dm1Item" maxOccurs="unbounded"/> </xs:sequence> </xs:complexType> </xs:element> |

FIG. 7A element dmInt

| | |
|---|---|
| diagram | 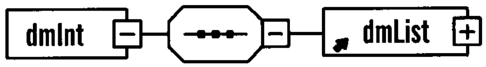 |
| children | dmList |
| used by | element sourceProfile |
| source | <xs:element name="dmInt"> <xs:complexType> <xs:sequence> <xs:element ref="dmList"/> </xs:sequence> </xs:complexType> </xs:element> |

element dmItem

| | |
|---|---|
| diagram | 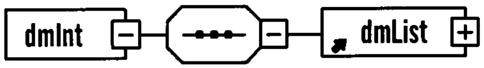 |
| children | domainTypeOfInterest |
| used by | element dmList |
| source | <xs:element name="dmItem"> <xs:complexType> <xs:sequence> <xs:element ref="domainTypeOfInterest"/> </xs:sequence> </xs:complexType> </xs:element> |

*FIG. 7B* element dmList

| | |
|---|---|
| diagram | 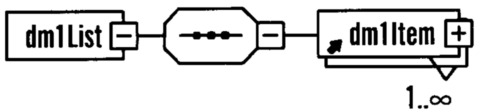 |
| children | dmItem |
| used by | element dmInt |
| source | <xs:element name="dmList"> <xs:complexType> <xs:sequence> <xs:element ref="dmItem" maxOccurs="unbounded"/> </xs:sequence> </xs:complexType></xs:element> |

element domain1TypeOfInterest

| | |
|---|---|
| diagram |  |
| type | restriction of xs:string |
| used by | element dm1Item |
| facets | enumeration Software<br>enumeration Workflow |
| source | <xs:element name="domain1TypeOfInterest"> <xs:simpleType> <xs:restriction base="xs:string"> <xs:enumeration value="Infrared"/><xs:enumeration value="Radar"/></xs:restriction> </xs:simpleType></xs:element> |

*FIG. 8A* element domainTypeOfInterest

| | |
|---|---|
| diagram |  |
| type | restriction of xs:string |
| used by | element dmItem |
| facets | enumeration Computers<br>enumeration Laptop |
| source | <xs:element name="domainTypeOfInterest"> <xs:simpleType> <xs:restriction base="xs:string"> <xs:enumeration value="Computers"/> <xs:enumeration value="Laptop"/> </xs:restriction> </xs:simpleType> </xs:element> |

element geoInt

| | |
|---|---|
| diagram | 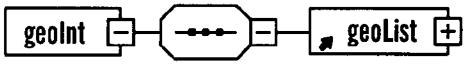 |
| children | geoList |
| used by | element sourceProfile |
| source | <xs:element name="geoInt"> <xs:complexType> <xs:sequence> <xs:element ref="geoList"/> </xs:sequence> </xs:complexType></xs:element> |

*FIG. 8B* element geoItem

| | |
|---|---|
| diagram | 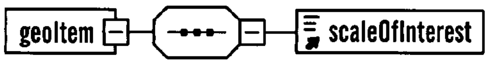 |
| children | scaleOfInterest |
| used by | element geoList |
| source | <xs:element name="geoItem"> <xs:complexType> <xs:sequence> <xs:element ref="scaleOfInterest"/> </xs:sequence> </xs:complexType> </xs:element> |

element geoList

| | |
|---|---|
| diagram | 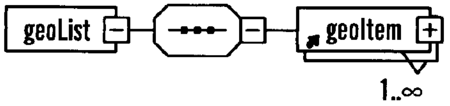 |
| children | geoItem |
| used by | element geoInt |
| source | <xs:element name="geoList"> <xs:complexType> <xs:sequence> <xs:element ref="geoItem" maxOccurs="unbounded"/> </xs:sequence> </xs:complexType> </xs:element> |

element goal

| | |
|---|---|
| diagram |  |
| type | xs:string |
| used by | element coiProfile |
| source | <xs:element name="goal" type="xs:string"/> |

*FIG. 9A* element homePage
| | |
|---|---|
| diagram |  |
| type | xs:string |
| used by | element coiProfile |
| source | <xs:element name="homePage" type="xs:string"/> |
element interestsProfile
| | |
|---|---|
| diagram | 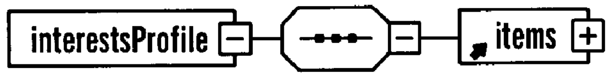 |
| children | Items |
| used by | element coiProfile |
| source | <xs:element name="interestsProfile"> <xs:complexType> <xs:sequence> <xs:element ref="items"/> </xs:sequence> </xs:complexType> </xs:element> |
FIG. 9B element item

| | |
|---|---|
| diagram | 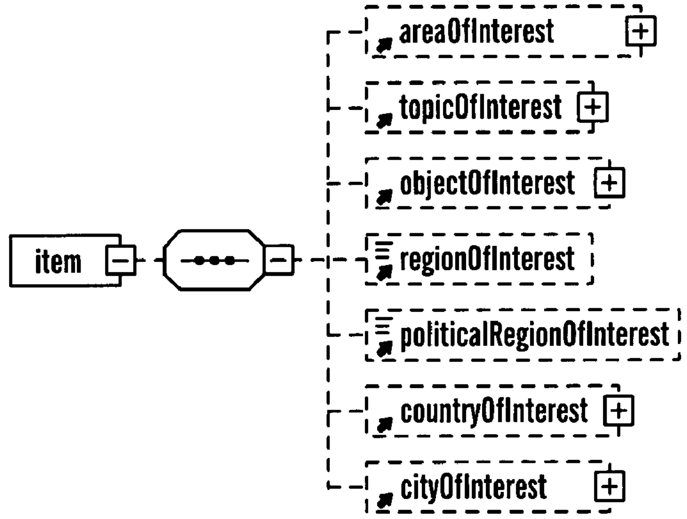<br> |
| children | areaOfInterest topicOfInterest objectOfInterest regionOfInterest politicalRegionOfInterest countryOfInterest cityOfInterest |
| used by | element items |
| source | <xs:element name="item"> <xs:complexType> <xs:sequence> <xs:element ref="areaOfInterest" minOccurs="0"/> <xs:element ref="topicOfInterest" minOccurs="0"/> <xs:element ref="objectOfInterest" minOccurs="0"/> <xs:element ref="regionOfInterest" minOccurs="0"/> <xs:element ref="politicalRegionOfInterest" minOccurs="0"/> <xs:element ref="countryOfInterest" minOccurs="0"/> <xs:element ref="cityOfInterest" minOccurs="0"/> </xs:sequence> </xs:complexType></xs:element> |

*FIG. 10A* element items

| | |
|---|---|
| diagram | 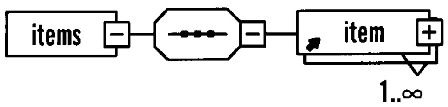  |
| children | item |
| used by | element interestsProfile |
| source | <xs:element name="items"> <xs:complexType> <xs:sequence> <xs:element ref="item" maxOccurs="unbounded"/> </xs:sequence> </xs:complexType> </xs:element> |

element leader

| | |
|---|---|
| diagram |   |
| type | xs:string |
| used by | element relationshipProfile |
| source | <xs:element name="leader" type="xs:string"/> |

element level

| | |
|---|---|
| diagram |   |
| type | xs:string |
| used by | element securityProfile |
| source | <xs:element name="level" type="xs:string"/> |

FIG. 10B element lowerLeftLocation

| | |
|---|---|
| diagram |  |
| type | xs:string |
| used by | element areaOfInterest |
| source | <xs:element name="lowerLeftLocation" type="xs:string"/> |

element memberItem

| | |
|---|---|
| diagram |  |
| type | xs:string |
| used by | element memberList |
| source | <xs:element name="memberItem" type="xs:string"/> |

element memberList

| | |
|---|---|
| diagram | 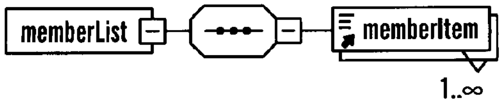 |
| children | memberItem |
| used by | element relationshipProfile |
| source | <xs:element name="memberList"> <xs:complexType> <xs:sequence> <xs:element ref="memberItem" maxOccurs="unbounded"/> </xs:sequence> </xs:complexType></xs:element> |

FIG. 11A element mission

| | |
|---|---|
| diagram | mission |
| type | xs:string |
| used by | element coiProfile |
| source | <xs:element name="mission " type="xs:string"/> | element objectId

| | |
|---|---|
| diagram | objectId |
| type | xs:string |
| used by | element objectOfInterest |
| source | <xs:element name="objectId" type="xs:string"/> |

FIG. 11B element objective

| | |
|---|---|
| diagram |  |
| type | xs:string |
| used by | element coiProfile |
| source | <xs:element name="objective " type="xs:string"/> |

element objectName

| | |
|---|---|
| diagram |  |
| type | xs:string |
| used by | element objectOfInterest |
| source | <xs:element name="objectName " type="xs:string"/> |

element objectOfInterest

| | |
|---|---|
| diagram | 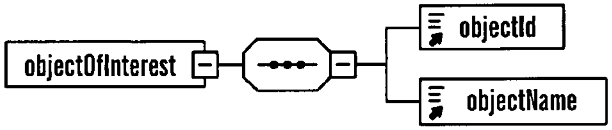 |
| children | objectId objectName |
| used by | element item |
| source | <xs:element name="objectOfInterest"> <xs:complexType> <xs:sequence> <xs:element ref="objectId"/> <xs:element ref="objectName"/> </xs:sequence> </xs:complexType></xs:element> |

FIG. 12A element orgId

| | |
|---|---|
| diagram | orgId |
| type | xs:byte |
| used by | element sponsor |
| source | <xs:element name="orgId" type="xs:byte"/> | element orgName

| | |
|---|---|
| diagram | orgName |
| type | xs:string |
| used by | element sponsor |
| source | <xs:element name="orgName" type="xs:string"/> |

*FIG. 12B* element politicalRegionOfInterest

| | |
|---|---|
| diagram | politicalRegionOfInterest |
| type | xs:string |
| used by | element item |
| source | <xs:element name="politicalRegionOfInterest" type="xs:string"/> |

element priority

| | |
|---|---|
| diagram | priority |
| type | xs:string |
| used by | element coiProfile |
| source | <xs:element name="priority" type="xs:string"/> |

element regionOfInterest

| | |
|---|---|
| diagram | regionOfInterest |
| type | xs:string |
| used by | element item |
| source | <xs:element name="regionOfInterest" type="xs:string"/> |

*FIG. 13A* element relationshipProfile

| | |
|---|---|
| diagram | 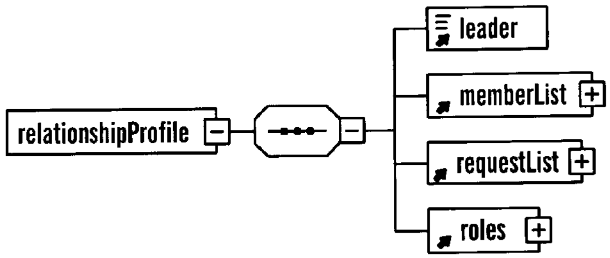  |
| children | leader memberList requestList roles |
| used by | element coiProfile |
| source | <xs:element name="relationshipProfile"> <xs:complexType> <xs:sequence> <xs:element ref="leader"/> <xs:element ref="memberList"/> <xs:element ref="requestList"/> <xs:element ref="roles"/> </xs:sequence> </xs:complexType> </xs:element> |

element requestItem

| | |
|---|---|
| diagram |   |
| type | xs:string |
| used by | element requestList |
| source | <xs:element name="requestItem" type="xs:string"/> |

*FIG. 13B* element requestList

| | |
|---|---|
| diagram | 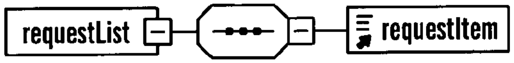 |
| children | requestItem |
| used by | element relationshipProfile |
| source | <xs:element name="requestList"> <xs:complexType> <xs:sequence> <xs:element ref="requestItem"/> </xs:sequence> </xs:complexType></xs:element> |

element role

| | |
|---|---|
| diagram | 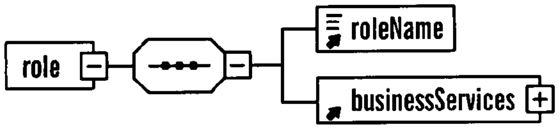 |
| children | roleName businessServices |
| used by | element roles |
| source | <xs:element name="role"> <xs:complexType> <xs:sequence> <xs:element ref="roleName"/> <xs:element ref="businessServices"/> </xs:sequence> </xs:complexType></xs:element> |

*FIG. 14A* element roleName

| | |
|---|---|
| diagram | roleName |
| type | restriction of xs:string |
| used by | element role |
| facets | enumeration analyst<br>enumeration customer<br>enumeration leader |
| source | <xs:element name="roleName"> <xs:simpleType> <xs:restriction base="xs:string"> <xs:enumeration value="analyst"/> <xs:enumeration value="customer"/> <xs:enumeration value="leader"/> </xs:restriction> </xs:simpleType> </xs:element> |

element roles

| | |
|---|---|
| diagram | 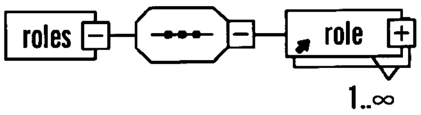 |
| children | role |
| used by | element relationshipProfile |
| source | <xs:element name="roles"> <xs:complexType> <xs:sequence> <xs:element ref="role" maxOccurs="unbounded"/> </xs:sequence> </xs:complexType> </xs:element> |

*FIG. 14B* element scaleOfInterest

| | |
|---|---|
| diagram |   |
| type | restriction of xs:short |
| used by | element geoItem |
| facets | enumeration 1000<br>enumeration 5000 |
| source | <xs:element name="scaleOfInterest"> <xs:simpleType> <xs:restriction base="xs:short"> <xs:enumeration value="1000"/> <xs:enumeration value="5000"/> </xs:restriction> </xs:simpleType></xs:element> |

element securityProfile

| | |
|---|---|
| diagram | 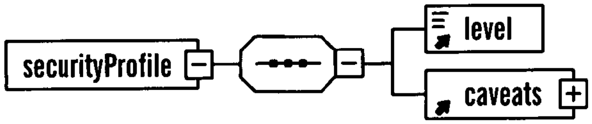  |
| children | level caveats |
| used by | element coiProfile |
| source | <xs:element name="securityProfile"> <xs:complexType> <xs:sequence> <xs:element ref="level"/> <xs:element ref="caveats"/> </xs:sequence> </xs:complexType></xs:element> |

*FIG. 15A* element service

| | |
|---|---|
| diagram |  |
| type | xs:string |
| used by | element businessServices |
| source | <xs:element name="service" type="xs:string"/> |

element sourceProfile

| | |
|---|---|
| diagram | 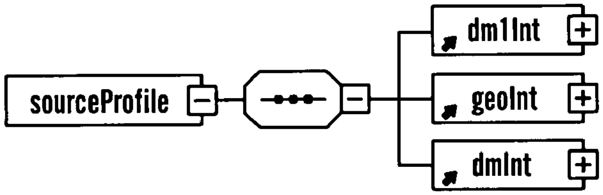 |
| children | dm1Int geoInt dmInt |
| used by | element coiProfile |
| source | <xs:element name="sourceProfile"> <xs:complexType> <xs:sequence> <xs:element ref="dm1Int"/> <xs:element ref="geoInt"/> <xs:element ref="dmInt"/> </xs:sequence> </xs:complexType></xs:element> |

*FIG. 15B* element sponsor

| diagram | 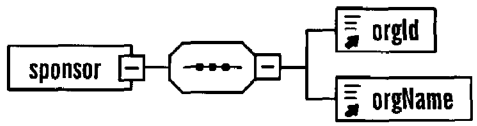 |
|---|---|
| children | orgId orgName |
| used by | element coiProfile |
| source | <xs:element name="sponsor"> <xs:complexType> <xs:sequence> <xs:element ref="orgId"/> <xs:element ref="orgName"/> </xs:sequence> </xs:complexType></xs:element> |

element startDate

| diagram | startDate |
|---|---|
| type | xs:string |
| used by | element coiProfile |
| source | <xs:element name="startDate" type="xs:string"/> |

element stopDate

| diagram | stopDate |
|---|---|
| used by | element coiProfile |
| source | <xs:element name="stopDate"> <xs:complexType/></xs:element> |

*FIG. 16A* element topicName

| | |
|---|---|
| diagram |   |
| type | xs:string |
| used by | element topicOfInterest |
| source | <xs:element name="topicName" type="xs:string"/> |

element topicOfInterest

| | |
|---|---|
| diagram | 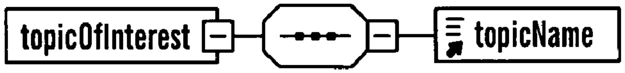  |
| children | topicName |
| used by | element item |
| source | <xs:element name="topicOfInterest"> <xs:complexType> <xs:sequence> <xs:element ref="topicName"/> </xs:sequence> </xs:complexType> </xs:element> |

FIG. 16B element upperRightLocation

| | |
|---|---|
| diagram | ≡ upperRightLocation |
| type | xs:string |
| used by | element areaOfInterest |
| source | <xs:element name="upperRightLocation" type="xs:string"/> | element uuid

| | |
|---|---|
| diagram | ≡ uuid |
| type | xs:string |
| used by | element coiProfile |
| source | <xs:element name="uuid" type="xs:string"/> |

*FIG. 17*

MULTI-LEVEL MULTI-USER WEB SERVICES SECURITY SYSTEM AND METHOD

BACKGROUND OF THE INVENTION

1. Technical Field

The present invention relates generally to network based security systems, and more particularly relates to a web services security system that utilizes an XML security schema.

2. Related Art

One of the primary benefits of distributed networks such as the Internet is the ability to readily share information to many people across many different computing environments. However, a critical challenge faced by many organizations involves providing security within such a distributed environment. The challenge becomes even more pronounced for organizations that wish to implement complex security structures, where for instance very specific pieces of data must be made available to different sets of users across distributed and heterogeneous computing environments.

Multi-level, multi-user security in a web services environment that can carry multi-dimensional access tokens to row level data (data physically located at its lowest abstraction such as in a row on a relational database) has not been successfully addressed in highly secure, highly distributed computing environments. Most current "commercial of the shelf" (COTS) products act as gatekeepers for localized directory structures, and/or coarse user authentication, or are monolithic in their application of common COTS products to achieve multi-level multi-user security for more fine grain access and authentication control. They do not easily allow for data items to be secured at different levels and across heterogeneous security domains. Accordingly, providing very fine grain authorization access to highly secure data within and across disparate organizations that are utilizing web services has been an extremely difficult problem to solve.

The difficulty of solving this issue, the newness of the underlying technologies driving web services, and the evolution of commercial off the shelf security products, combined with the need in many circumstances to rapidly deploy a suitable security technique has given rise to a need for a more complete data security solution.

SUMMARY OF THE INVENTION

The present invention addresses the above-mentioned problems, as well as others, by providing a security architecture that includes an XML based security schema that provides a security authorization solution allowing granular access to data in a distributed heterogeneous computing environment. In a first aspect, the invention provides a security architecture for granting multi-level access to data items in a distributed network, comprising: an authentication server that provides access to a web portal using a web services based communication framework; a system for securely establishing security credentials for an end user logging into the authentication server system; an access directory that obtains the security credentials for the end user from the authentication server, generates a set of XML credential data based on a predefined XML schema, and returns the XML credential data to the authentication server; and wherein the authentication server passes the XML credential data to the web portal in order to grant access to the end user for data items accessible via the web portal.

In a second aspect, the invention provides a method for granting multi-level access to data items in a distributed network, comprising: providing an authentication server that can communicate with a web portal using a web services based framework; establishing security credentials for an end user while logging into the authentication server; converting the security credentials to a set of XML security data based on a predefined XML security schema; passing the XML security data from the authentication server to the web portal; and granting access to data items accessible via the web portal based on the XML security data.

In a third aspect, the invention provides a system for providing multi-level access to data items in a distributed network, comprising: a web portal for providing access to data items, wherein each data item is tagged with at least one identifier that dictates access to the data item based upon a predefined set of schema constructs; and an authentication system for logging users into the web portal, wherein the authentication system is in communication with the web portal via a web services based communication framework, and wherein the authentication system includes: a system for generating a set of XML credential data during a user login based on a predefined XML schema; and a system for passing the set of XML credential data to the web portal to determine access to tagged data items for the user.

Accordingly, the invention comprises a security technique that utilizes a web services architecture, along with a defined XML schema, to provide coarse level security across heterogeneous computing domains. The schema supports a core framework for building scalar security schemas quickly based on common security access criteria for a community of interested parties in the shared common data, i.e., an interest community. The schema provides a fast start mechanism and vernacular to talk to distributed heterogeneous security domains that can be utilized within the context of the applied security access technique described herein.

Furthermore, multi-level security tagging of data is provided, and is accessed with tokens (or caveats) that dictate a user's level of authorization for accessing granular data. Accordingly, an overarching "ne plus ultra" authority is required as a logical business entity across domains that can validate user caveats from different domains, and issue coarse security authentication.

BRIEF DESCRIPTION OF THE DRAWINGS

These and other features of this invention will be more readily understood from the following detailed description of the various aspects of the invention taken in conjunction with the accompanying drawings in which:

FIGS. 2-17 graphically depict an XML security schema in accordance with the present invention.

DETAILED DESCRIPTION OF THE INVENTION

Figure 1:
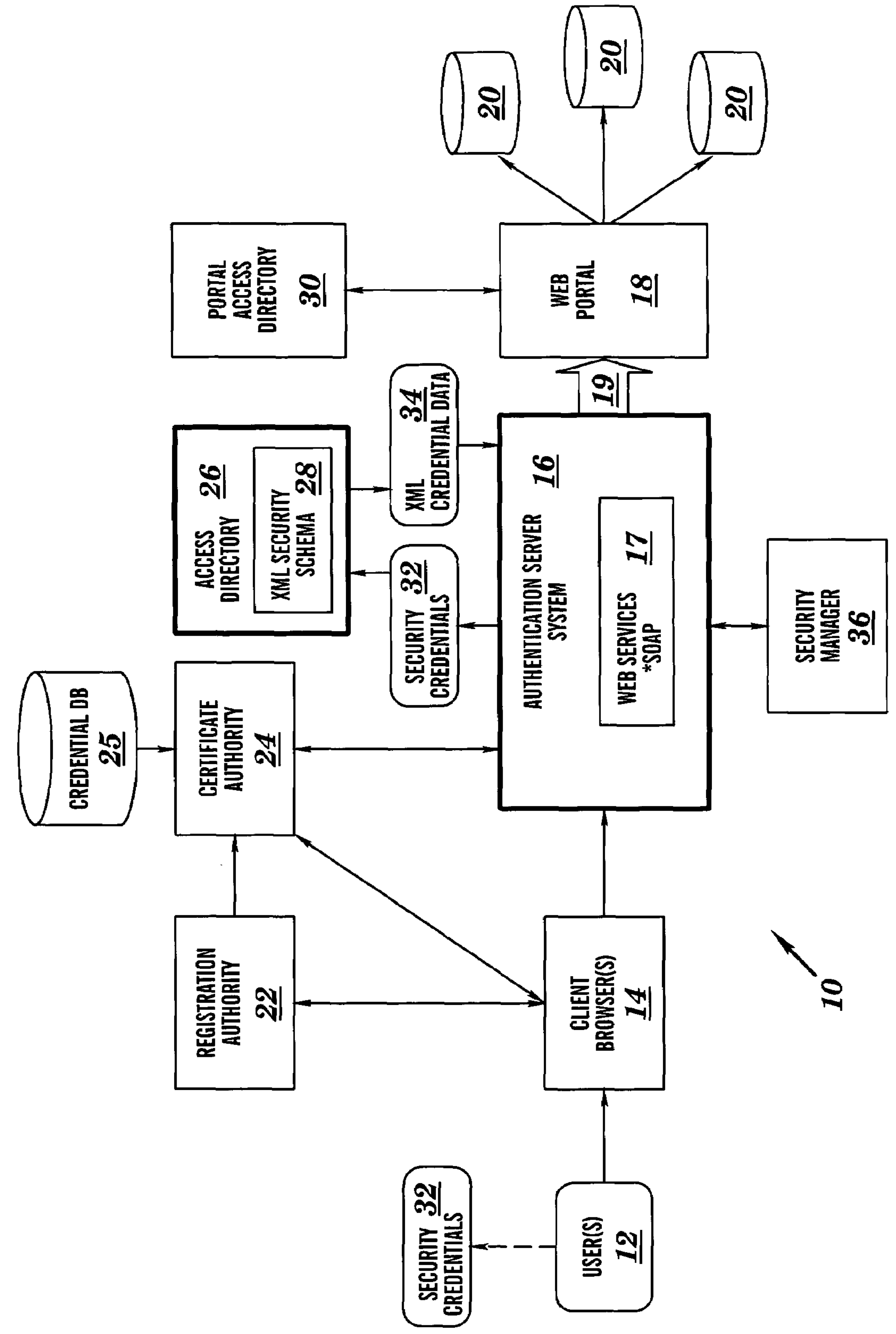
FIG. 1 depicts an architectural overview of a security system in accordance with the present invention.

Referring now to the drawings, FIG. 1 depicts an architecture 10 of a web services based security environment that allows users 12 to access secure data 20 located at disparate locations on a distributed network, such as the World Wide Web (web). More specifically, access to secure data 20 is provided via a login process to an authentication server system 16 using client browser 14. Client browser 14 provides access to at least one portal web site 18 utilizing, e.g., a standard http URL, and also provides information to a registration authority 22 that implements a logical domain specific process for user registration, initial processing, etc. In some domains, this process is manifested as a capture of pertinent user information and details. While the particular implementation of this process is not at issue, the existence of some logical domain specific process is required to build a set of security credentials 32.

Security credentials 32 determine which specific sets of data each user shall be granted access to. Examples may include, e.g., predefined levels of authority, community memberships, etc. It should be understood that the elements, types, categories and overall framework of the security credentials 32 are not limited, and will generally depend on the type of application being implemented. However, the utilization of the disclosed schema will address a large percentage of potential cross-domain security environments, serving as a "fast start" schema implementation and technique. For instance, in a typical corporate environment, a user may have manager level privileges and belong to a human resources community and a marketing community. In a government application, the user may have top-secret privileges and be granted access to navy, DARPA, and weapons of mass destruction communities.

As noted above, security credentials 32 for the user can be established and verified using known techniques with registration authority 22 and certificate authority 24. A registration authority (RA) 22 is an authority in a network that verifies user requests for a digital certificate and tells the certificate authority (CA) 24 to issue it. RAs are part of a public key infrastructure (PKI), a networked system that enables companies and users to exchange information safely and securely. The digital certificate contains a public key that is used to encrypt and decrypt messages and digital signatures.

A certificate authority (CA) 24 is an authority in a network that issues and manages security credentials and public keys for message encryption. As part of a public key infrastructure (PKI), a CA checks with a registration authority (RA) to verify information provided by the requestor of a digital certificate. If the RA verifies the requestor's information, the CA can then issue a certificate. Depending on the public key infrastructure implementation, the certificate includes the owner's public key, the expiration date of the certificate, the owner's name, and other information about the public key owner. In this case, the certificate authority 24 would store the security credentials 32 for each user in credential database 25, and issue a certificate that included security credentials 32 for the particular user when the user logs in.

This technique can utilize a variety of simple administration components to allow credential inputs and design by the business operation of the registration authority 22, such as a Java interface to assist in building and administering user credentials at this level.

During login, authentication server system 16 acts as a reverse proxy to obtain the security credentials 32 via a proxy certificate. In addition to providing log in capabilities, authentication server system 16 provides an engine to assist in directory abstraction of required or requested files that reside on a specific server machine in a directory structure a user would need to access in order to perform some unit of work, search or data acquisition. These files may exist in disparate physical and logical locations, and are generally shown as secure data 20. Supporting the authentication server system 16 is a security manager 36 that validates the "logging" user and builds the security credentials 32. It is here where the actual security credentials 32 are built and verified with the certificate authority 24. Security manager also supports revocation checking, and mapping Public Key credentials to access permissions, ultimately passing this back to the authentication server system 16.

Authentication server system 16 provides the composite, validated credential for user access to a web portal 18, which can take any form, such as YAHOO!® or a proprietary portal, using a web services based framework 17. This model can support multiple domain portal instances, with their associated data since it serves as the overarching security framework for distributed systems. Web services ensures that communications are described in some structured manner. Specifically, in this case, an XML grammar or schema is provided in this invention for describing and automating the communication of a user's security credentials 32 to the web portal 18.

In this exemplary embodiment, the SOAP protocol is utilized. SOAP is a lightweight protocol intended for exchanging structured information in a decentralized, distributed environment. SOAP uses XML technologies to define an extensible messaging framework, which provides a message construct that can be exchanged over a variety of underlying protocols. The framework has been designed to be independent of any particular programming model and other implementation specific semantics. Thus, SOAP allows XML messages to be easily moved to the web portal. Accordingly, using SOAP, or a similar protocol, an XML based communications environment 19 between authentication server system 16 and web portal 18 is provided.

Access to the secure data 20 within this environment is implemented by utilizing an access directory 26 that obtains the security credentials 32 for the user and generates XML credential data 34 that includes: (1) security profile information including a set of XML tokens (i.e., caveats), and (2) community of interest "COI" information. The tokens and COI information, which are passed to the web portal 18, dictate which data items the end-user will have authorized access to. XML credential data 34 is generated by the access directory 26 based on an XML security schema 28. The XML security schema 28 is parsed for the validation of the user, as well as construction of the security credentials 32.

An example of XML credential data 34 is provided as follows:

```
<?xml version="1.0" encoding="UTF-8" ?>
- <userProfile>
    <userName>jdoe</userName>
    <startDate>6/1/2002</startDate>
    <stopDate>5/31/2003</stopDate>
  - <sponsor>
      <orgId>1</orgId>
      <orgName>DARPA</orgName>
    </sponsor>
  - <contactProfile>
      <title>Mr.</title>
      <firstName>John</firstName>
      <middleName>N</middleName>
      <lastName>Doe</lastName>
      <email>jdoe@DARPA.gov</email>
      <ssn>111-11-1111</ssn>
      <workPhone>703-555-1234</workPhone>
      <mobilePhone>703-555-4321</mobilePhone>
      <pager>888-555-1234</pager>
      <fax>703-555-1212</fax>
    - <address>
```

-continued

```
        <street1>123 Main Ave</street1>
        <street2>Apt 1020</street2>
        <city>McLean</city>
        <state>VA</state>
        <country>US</country>
      </address>
    </contactProfile>
- <securityProfile>
      <level>CLASS-D</level>
    - <caveats>
        <caveat>C1</caveat>
        <caveat>C2</caveat>
        <caveat>C3</caveat>
        <caveat>R1</caveat>
        <caveat>R2</caveat>
        <caveat>R3</caveat>
        <caveat>R4</caveat>
      </caveats>
    </securityProfile>
- <coiProfile>
    - <assigned>
      - <coi>
            <coiName>Weapons of Mass Destruction</coiName>
            <uuid>DARPA1</uuid>
          - <roles>
            - <role>
                <roleName>analyst</roleName>
              - <businessServices>
                  <service>imagery</service>
                  <service>geospatial</service>
                  <service>imageryReports</service>
                  <service>video</service>
                  <service>multi-source info</service>
                  <service>collaborate white board</service>
                  <service>sigint</service>
                  <service>humint</service>
                  <service>osint</service>
                </businessServices>
              </role>
            </roles>
          </coi>
    - <coi primary="true">
          <coiName>Central Asia COI</coiName>
            <uuid>centralasia</uuid>
          - <roles>
            - <role>
                <roleName>analyst</roleName>
              - <businessServices>
                  <service>imagery</service>
                  <service>geospatial</service>
                  <service>imageryReports</service>
                  <service>video</service>
                  <service>multi-source info</service>
                  <service>collaborate white board</service>
                  <service>sigint</service>
                  <service>humint</service>
                  <service>osint</service>
                </businessServices>
              </role>
            </roles>
          </coi>
      </assigned>
    - <available>
        - <coi>
            <coiName>WMD COI</coiName>
            <uuid></uuid>
          </coi>
        </available>
    </coiProfile>
- <interestsProfile>
    - <items>
        - <item>
          - <areaOfInterest>
              <lowerLeftLocation>000000N0000000E</lowerLeft
              Location>
              <upperRightLocation>200000N0000000W</
              upperRightLocation>
            </areaOfInterest>
          </item>
```

-continued

```
        - <item>
          - <topicOfInterest>
            <topicName>WMD</topicName>
          </topicOfInterest>
        </item>
        - <item>
            - <topicOfInterest>
                <topicId>22222</topicId>
              <topicName>XYZAirport</topicName>
            </topicOfInterest>
          </item>
        - <item>
          - <topicOfInterest>
              <topicId>22222</topicId>
              <topicName>US Consulate - Karachi</topicName>
            </topicOfInterest>
          </item>
        - <item>
          - <topicOfInterest>
              <topicId>11111</topicId>
              <topicName>XYZ Checkpoint</topicName>
            </topicOfInterest>
          </item>
        - <item>
          - <topicOfInterest>
              <topicName>Counter Narcotics</topicName>
            </topicOfInterest>
          </item>
        - <item>
          - <topicOfInterest>
            <topicId>22222</topicId>
              <topicName>Ministry of Foreign Affairs</topicName>
            </topicOfInterest>
          </item>
        - <item>
          - <topicOfInterest>
              <topicId>22222</topicId>
              <topicName>Embassy of XYZ</topicName>
            </topicOfInterest>
          </item>
      </items>
    </interestsProfile>
  </userProfile>
```

As can be seen, the XML credential data includes: user profile information (e.g., name, address, etc.); security profile that includes a level and caveats; community of interest profile information that includes one or more communities (e.g., DARPA, FBI, Central Asia COI, WMD COI); interest profile information that includes various topics of interests (e.g., Karachi Airport, Counter Narcotics, etc).

Caveats in the context of the XML Security schema 28 represent the application of multi-level user security credentials. Caveats function in relation to the element "levels" in that caveats represent finer grain details of security levels in a multi-level security schema. It is important to recognize that the invention provides the ability for disparate organizations to maintain control of their local and unique users and data, and still share critical information with others, which is a well understood and recognized concept for optimized synergistic operation within an unlimited category of domain types, including commercial industries or governmental entities. However the quandary solved by this invention is the ability to classify users and data in a very simple and straightforward way so that native domain data can be securely compartmentalized for internal users, yet marked for sharing outside the organizational boundary with other alien (with respect to the data) organizations. The solution includes the technique and application of two level (or two tier) caveats.

It must be pointed out that the ability within the domain to tag user, data and/or metadata levels with the two-tier caveat is important to this technique. The assumption is that a cross-domain governance authority and business rules exist at the Registration Authority level to assure that inter-domain caveat ontology is taxonomically applied across domains. There are a variety of business and technical implementation methodologies that can use this technique, with the most obvious being association to relational data constructs as keys or allied tagging within a relational data construct as one of many low level associations for anyone familiar with the art.

Thus, the ability to apply relatively simple constructs such as masking against data to user credential so that users can always access the appropriate data for their security level can be view by the following construct:

(metadata.class<=user.class)

Such an artifice is exquisitely applied within the context of a relational query against caveats.

Caveats contain two subcategories for the users' security compartment and the releasability level of the topic data, which in the following "WMD COI" illustration showing an exemplar schema, are indicated as caveats C1, C2, and C3. This could for instance, represent domain user security levels of Unclassified for C1, Secret for C2 and Top Secret for C3. The releasability caveat levels R1, R2, and R3 represent the domain qualifiers that can place restrictions on users and data that can review the information outside the home domain. For example, native information is contained within Enterprise X, and is unclassified, and has caveat C1, R1 applied. Business rules in place in this inter-domain scenario dictate that all users of that enterprise can review this information. However the data caveat R2 imposed by Enterprise X, restricts Enterprise Y from obtaining this information. Thus, the interpretation in this example would be that the information is only available to the home Enterprise X, and not available to be shared with any other domain.

The following listing provides an XML listing of a community of interest profile for a particular community of interest, entitled: "WMD COI." The community of interest profile includes various information, including sponsor information, home page information, member information, roles, and various interests (e.g., topics, geographies, etc.) that are given to the members when a members XML credential data 34 is built. The community of interest profile is passed as part of the XML credential data 34 to web portal 18.

```
<?xml version="1.0" encoding="UTF-8" ?>
- <coiProfile>
  - <securityProfile>
      <level>CLASS-D</level>
    - <caveats>
        <caveat>C1=true</caveat>
        <caveat>C=false</caveat>
        <caveat>C3=fales</caveat>
        <caveat>R1=true</caveat>
        <caveat>R2=false</caveat>
        <caveat>R3=fales</caveat>
      </caveats>
    </securityProfile>
    <uuid>wmd1</uuid>
    <coiName>WMD COI</coiName>
    <coiType>Topical</coiType>
    <coiNetworkType>Network</coiNetworkType>
    <coiStatus>Operational</coiStatus>
    <startDate>06/12/1996</startDate>
    <stopDate />
```

-continued

```
    <priority>Crisis</priority>
  - <sponsor>
      <orgId>8</orgId>
      <orgName>DARPA</orgName>
    </sponsor>
    <homePage>http://www.WMD.COI.gov</homePage>
    <mission>To proactively and collaboratively support research of
      Weapons of Mass Destruction</mission>
    <goal>To build WMD database.</goal>
    <objective />
  - <relationshipProfile>
      <leader>Dr. John Q Public</leader>
    - <memberList>
        <memberItem>Dr. Richard Smith</memberItem>
        <memberItem>Susan Doe</memberItem>
        <memberItem>Clay Nior</memberItem>
        <memberItem>George Brown</memberItem>
        <memberItem>Elaine White</memberItem>
        <memberItem>Jack Gray</memberItem>
        <memberItem>Louis Black</memberItem>
        <memberItem>Jackie Green</memberItem>
        <memberItem>David Blanc</memberItem>
      </memberList>
- <requestList>
      <requestItem>Dennis Schwartz</requestItem>
  </requestList>
- <roles>
    - <role>
          <roleName>leader</roleName>
        - <businessServices>
            <service>imagery</service>
            <service>geospatial</service>
            <service>imageryReports</service>
            <service>video</service>
            <service>multi-source topic info</service>
            <service>collaborate white board</service>
            <service>sigint</service>
            <service>humint</service>
            <service>osint</service>
          </businessServices>
        </role>
      - <role>
          <roleName>analyst</roleName>
        - <businessServices>
            <service>imagery</service>
            <service>geospatial</service>
            <service>imageryReports</service>
            <service>video</service>
            <service>multi-source topic info</service>
            <service>collaborate white board</service>
            <service>sigint</service>
            <service>humint</service>
              <service>osint</service>
          </businessServices>
      </role>
    - <role>
          <roleName>customer</roleName>
        - <businessServices>
            <service>imagery</service>
            <service>geospatial</service>
            <service>imageryReports</service>
            <service>video</service>
            <service>multi-source topic info</service>
            <service>collaborate white board</service>
            <service>humint</service>
            <service>osint</service>
            </businessServices>
        </role>
    </roles>
  </relationshipProfile>
- <sourceProfile>
    - <imInt>
      - <imList>
          - <imItem>
              <imageTypeOfInterest>Landsat</imageTypeOfInterest>
            </imItem>
          - <imItem>
            <imageTypeOfInterest>HighResolution</imageType
            OfInterest>
```

-continued

```
        </imItem>
      </imList>
    </imInt>
- <geoInt>
    - <geoList>
      - <geoItem>
          <scaleOfInterest>1000</scaleOfInterest>
        </geoItem>
      - <geoItem>
            <scaleOfInterest>5000</scaleOfInterest>
          </geoItem>
      </geoList>
    </geoInt>
- <maasInt>
    - <maasList>
      - <maasItem>
            <videoTypeOfInterest>Day</videoTypeOfInterest>
          </maasItem>
        - <maasItem>
            <videoTypeOfInterest>Night</videoTypeOfInterest>
          </maasItem>
        </maasList>
    </maasInt>
  </sourceProfile>
- <interestsProfile>
  - <items>
    - <item>
      - <areaOfInterest>
          <lowerLeftLocation>000000N0000000E</lowerLeft
          Location>
          <upperRightLocation>200000N0000000W>/upperRight
          Location>
        </areaOfInterest>
    - <topicOfInterest>
        <topicName>WMD</topicName>
      </topicOfInterest>
    - <topicOfInterest>
        <topicId>#12345678</topicId>
        <topicName>WMD</topicName>
      <topicOfInterest>
      <regionOfInterest />
      <politicalRegionOfInterest />
    - <countryOfInterest>
        <countryCode>US</countryCode>
        <countryName>United States</countryName>
      </countryOfInterest>
    - <cityOfInterest>
        <countryCode>US</countryCode>
        <city>Fairfax</city>
      </cityOfInterest>
  </item>
- <item>
    - <topicOfInterest>
        <topicName>Counter Narcotics</topicName>
      </topicOfInterest>
  </item>
- <item>
    - <topicOfInterest>
        <topicId>#12345678</topicId>
        <topicName>WMD</topicName>
      </topicOfInterest>
  </item>
- <item>
      <politicalRegionOfInterest />
  </item>
- <item>
    - <countryOfInterest>
        <countryCode>UK</countryCode>
        <countryName>United Kingdom</countryName>
      </countryOfInterest>
  </item>
- <item>
      - <cityOfInterest>
          <countryCode>US</countryCode>
          <city>Herndon</city>
        </cityOfInterest>
      </item>
    </items>
  </interestsProfile>
</coiProfile>
```

The XML security schema 28 definition is central to the application of this security technique in that it describes the web services definition of the security vernacular and forms a common methodology within which to provide the security elements. The XML security schema consists of 62 elements that form the necessary elements to utilize the complete applied security technique and consist of the following XML element descriptions:

| | |
|---|---|
| areaOfInterest | With children Lower Left and Upper Right represent a geospatial orientation reference for any data or meta data the user has access to. This is used by the element "item". businessServices - With child service in an unbounded one service to many potential representative services the user can access and is utilized by the element "role" |
| caveat | Used by the element "caveats" and has enumeration facets that form the containers for the users security constraints as described by the domain. For example assume a DoD user who has security access TS/SCI assigned by the governance authority that describes and confirms the credentials that are operationally originated by domain business rules and processes, then confirmed and passed to the Registration Authority. Once the confirmation of credentials is made, the technical means to begin the construction and transportation of those credentials is started. In this example caveats would have enumerations for this user representing the security compartments, Special Compartmentalized Information (SCI) and occupying an enumerations defined by business rules, governance and inhabiting C1, C2, or C3. FIGS. 2–17 presents these enumerations as a six level construct C1, C2, C3, for the compartment overlays of the user. The R1, R2, R3 are enumerations for matching to the releasability of data noting that these definitions must be made according to the domain based in business rules and applicable across domains. This claim makes no assumptions as to the plethora of |

-continued

| | |
|---|---|
| | potential enumerations however does claim the construct of a security caveat enumeration and compartment and releasability constructs within the schema as the finest grain security component thus forming cross domain web service based multi-user multi-level security. During registration the user would provide an access request and then upon confirmation by the Registration Authority these would then accompany the encapsulated security access descriptors. Additionally this requires the domain(s) to tag releasability levels to the information. While the enumerations can change as to specification, the important constructs are the caveat, its domain specific enumerations, and the business authority to confirm, authorize, and build those credentials within the context of the claimed security schema. |
| caveats | The child of caveat, and used by securityProfile, is the connecting element between the higher-level construct of securityProfile and the lower level caveat and its fine grain enumerations. |
| City and cityOfInterest | Are used by schema element item rolling up to interestProfile and ultimately at the top level to coiProfile which describes the 17 top level child descriptions in the COI profile which are; securityProfile, uuid, coiName, coiType, coiNetworkType, coiStatus, startDate, stopDate, priority, sponsor, homepage, mission, goal, objective, relationshipProfile, sourceProfile, interestProfile. |
| coiName | Is used by the top level coiProfile and consists of the name of the community of interest a user is associated with. Definition of these communities of interest are made by business rules of the governing body that works at the Registration Suthroity level. Associating a user in a multi-user, multi-level security services based computing model to a community of interest is a vital construct in order to support cross domain user association and the ability to access pertinent alien (non user home domain specific) data that is shared among distributed domains. |
| coiNetworkType | Is used by the top-level coiProfile, and is a description of the users home network. This description is vital to the ability of the user credential to pass user home network information encapsulated in the security header. This information could be as thin as a descriptive identifier or could pass descriptive information within the user credential. |
| coiProfile | Is the top level user description consisting of the 17 child descriptions associated with a user profile consisting of the following; securityProfile, uuid, coiName, coiType, coiNetworkType, coiStatus, startDate, stopDate, priority, sponsor, homepage, mission, goal, objective, relationshipProfile, sourceProfile, interestProfile. The construct that has cross-domain users associated with a minimum of one community of interest is a mandatory dimension of the security schema. Because in a cross domain, services based computing environment it is expected that one domain has users of a particular stratification along a common interest, the articulation of this interest is the primary vector in their need for cross domain data access sharing and security concern. Moreover because of the nature of various security information and levels, this could take the form of for example a subcontractors interest in contract pricing levels but the prime filtering the access to only non-proprietary pricing review items to the sub contractor. Thus the community in this example could be the x-Program Finance community of interest, a shared membership between two different contractors. |
| coiStatus | At the certificate Authority level of the model, a community of interest has a lifecycle and thus this descriptor is used to tag the status of the community typically as active, inactive, or pending. The business rules at the Certification Authority level will dictate the enumerations associated with this element. |
| coiType | A child of coiProfile that is a further definition of the community of interest. This decomposition would detail coiName by the inclusion of the nature of the community and would be defined and managed by the governance at the Certification Authority level. |
| | countryCode, countryName and countryofInterest - and their lower level elements are all children of the following, item, interests interestProfile and finally coiProfile at the top level. These descriptors support the definition of the users data interest. |

-continued

| | |
|---|---|
| dm1Int, dm1List, dm1Item, domain1TypeOf Interest | All pertain to additive security domain definitions (See dmList, dmInt, dmItem, domainTypeOfInterest) |
| dmList, dmInt, dmItem, domainTypeOfInterest | Are the decomposition of layers of user data interest descriptions associated with their overall profile against domain specific information. The lowest level is domainTypeOfInterest and the associated low level enumerations which in the example schema include the exemplars of "camera" and "gun". |
| GeoInt, geoList, GeoItem and scaleOfINterest | All are children of sourceProfile and describe the geospatial references of data and the associated user credentials |
| goal | Is the stated goal of a COI |
| homePage | Is the URL of a COI. A Web Services based community of interest in a multiple domain paradigm will have a by definition a centralized area, typically within a web portal, to search and retrieve information |
| interestProfile | This is the top-level element having Items, item and the more granular descriptions of COI topics including areaOfInterest, topicOfInterest, object OfInterest, regionOfInterest, politicalRegionOfInterest, countryOfInterest, and cityOfInterest. |
| Item and Items | The link elements between interestProfile and the more granular description elements |
| leader | A child of relationshipProfile describing the leader of a COI |
| level | A child of securityProfile describing the level of the users security. IE Secret, Top Secret in a government or DOD domain |
| lowerLeftLocation | A child of areaOfINterest describing the geospatial reference point |
| memberItem | Lowest level element for relationshipProfile as a child of memberList |
| memberList | Describes the COI members |
| mission | Describes the missionof the COI |
| objectID | Identification of the object of interest as an identification number |
| objectives | The stated objectives of the COI |
| objectName | The name of the objectOfInterest |
| orgId | The assigned organization Identification. This would represent the cross domain identification assigned at the Certificate Authority as defined by inter domain business rules |
| orgName | This represents the name of the organization assigned at the Certificate Authority as defined by inter domain business rules |
| polititical RegionOfInterest | Lower level detail of an Item representing a political region IE Texas defined by business rules |
| priority | Refers to the priority level of the COI as assigned and maintained by the business runes and overarching governance IE Top Priority, National Security, Law Enforcement etcetera. |
| regionOfInterest | Lower level detail of item representing a geographic region IE Asia |
| relationshipProfile | Detailing the cross domain membership information with leader, memberList, requestList and roles as children |
| RequestItem and requestList | Children of relationshipProfile that define the detail of user requested data across domains |
| role, roleName and roles | Linkage between relationshipProfile and lower business service requests and the user role in that request |
| scaleOfInterest | Geospatial detail of sourceProfile |
| securityProfile | Higher level element of children of level and caveats |
| service | Descriptor of a requested business service from a provider across domains in a web services paradigm |
| sourceProfile | The link category between COI profile and domain items of interest definitions |
| sponsor | The sponsoring doman description which could be different from the COI and a member domain |
| startDate, stopDate | The begin and end dates of user COI membership |
| TopicName TopicOfInterest | Low level descriptions of item under interestProfile |
| upperRight | The associated geospatial reference point for areas of interest |
| uuid | The users unique user identification number |

Figure 18A:
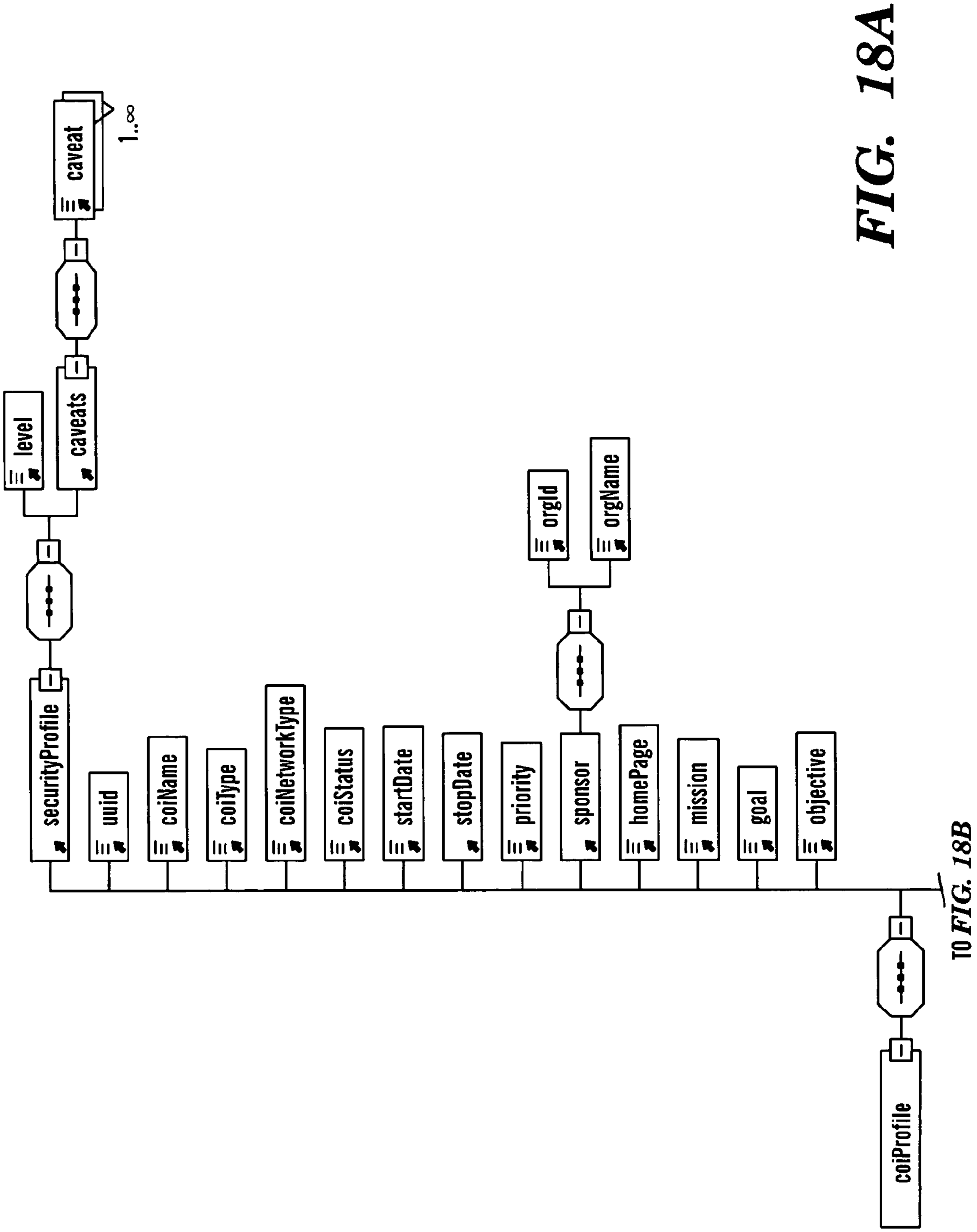
FIG. 18 depicts a graphical view of the combined hierarchy of the schema.
Figure 18B:
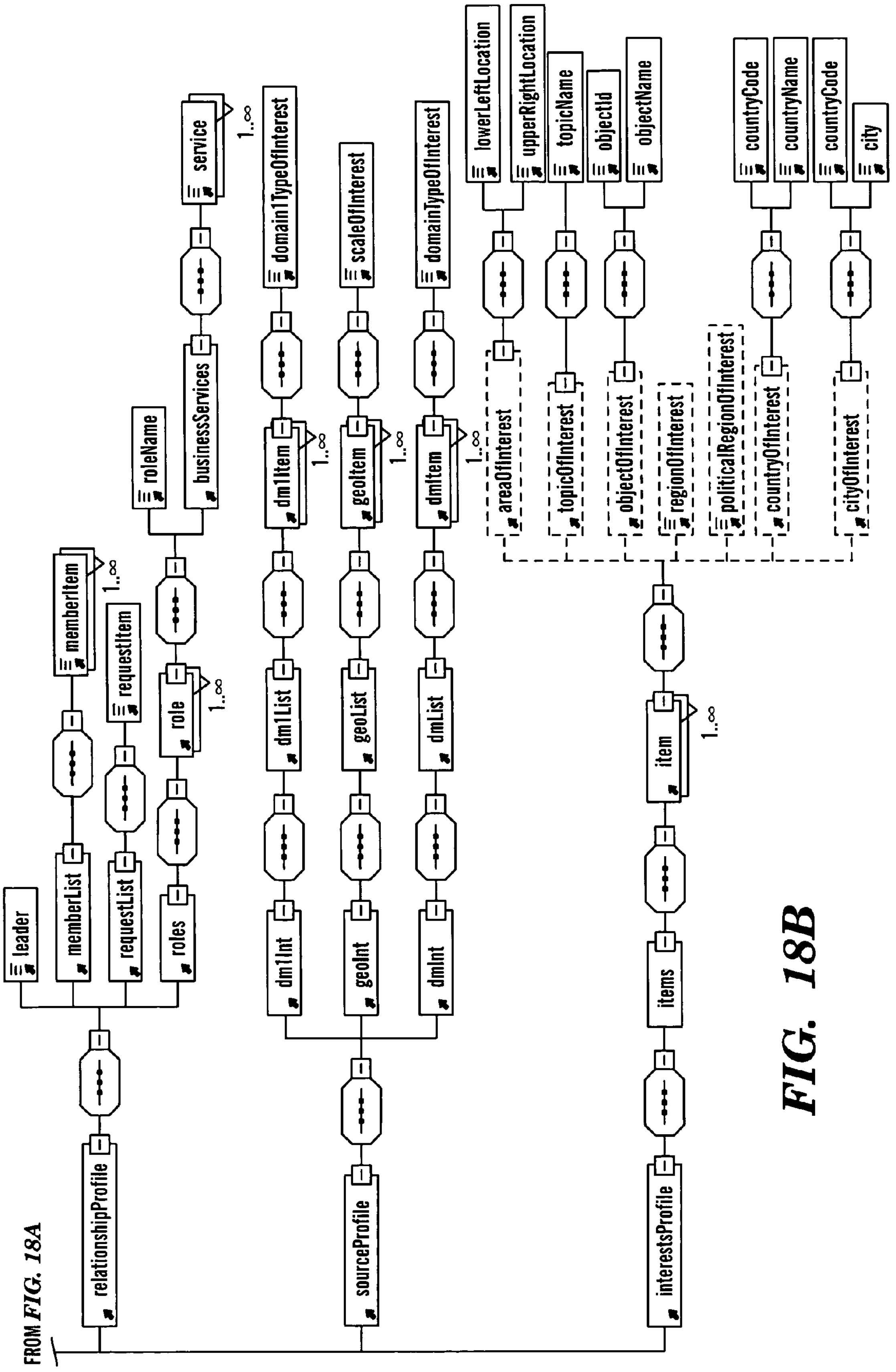

A more complete graphical definition of the XML security schema 28 is shown in FIGS. 2-17. FIG. 18 depicts a graphical representation of the XML security schema 28 for a community of interest profile. The schema 28 resides at the access directory 26 in the architecture 10 of FIG. 1, and is parsed for the validation of the user as well as construction of the security credentials. This schema has been designed to address various core issues to support the applied security technique. First, due to its global applicability and flexible reuse depending upon domain application, the schema 28 becomes a common core vernacular within which passing security credentials can be accomplished for multi-user multi-level security access. In addition, the schema 28, being standards based as a W3C XML schema definition, can be applied in a variety of cross domain, cross product security objects thereby increasing the interoperability of the technique.

Once built, authentication server system 16 passes the XML credential data 34, e.g., in a SOAP header, to the web portal 18. Portal access directory 30 then parses the XML credential data such that the web portal can decide which subsets of the secure data 20 the user has access to. Specifically, data items stored within secure data 20 may exist at any level within a multi-level data structure and can be tagged at any level (e.g., at hierarchical nodes, at directory/file/data levels, at rows within a database, etc.). Thus, it is possible to control who should have access to very fine granular data, e.g., a row of data.

Data tagging within each domain is keyed to the XML security schema 28 within the context of relational database row title for underlying datasets as the type descriptor. It is possible to maintain a meta-data repository consisting of URL pointers to enhance search efficiency as a possible implementation of this invention.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A security architecture for granting multi-level access to data items in a distributed network, comprising:

an authentication server that provides access to at least one web portal using a web services based communication framework;

a system for securely establishing security credentials for an end user logging into the authentication server system;

an access directory that obtains the security credentials for the end user from the authentication server, generates a set of XML credential data based on a predefined XML schema, and returns the XML credential data to the authentication server; and wherein the authentication server passes the XML credential data to the at least one web portal in order to grant access to the end user for data items accessible via the at least one web portal.

2. The security architecture of claim 1, wherein the system for securely establishing security credentials comprises a registration authority and a certificate authority.

3. The security architecture of claim 1, wherein user access to the authentication server is provided via a browser client.

4. The security architecture of claim 1, further comprising a portal access directory for parsing the XML credential data for the at least one web portal.

5. The security architecture of claim 1, wherein each data item is tagged with at least one identifier that dictates access to the data item based upon a predefined set of schema constructs.

6. The security architecture of claim 5, wherein the data item can be tagged at any level within a multi-level data structure.

7. The security architecture of claim 6, wherein the level is selected from the group consisting of: a row of a database, a node in a hierarchical tree, a file, and a directory of files.

8. The security architecture of claim 1, wherein the XML security schema includes a structure for defining a security profile and a community of interest profile.

9. The security architecture of claim 8, wherein the security profile includes a security level and a set of caveats.

10. The security architecture of claim 8, wherein the community of interest profile includes topics of interest.

11. A method for granting multi-level access to data items in a distributed network, comprising:

providing an authentication server that can communicate with a web portal using a web services based framework;

establishing security credentials for an end user while logging into the authentication server;

converting the security credentials to a set of XML security data based on a predefined XML security schema;

passing the XML security data from the authentication server to the web portal; and granting access to data items accessible via the web portal based on the XML security data.

12. The method of claim 11, wherein the step of securely establishing security credentials comprises utilizing a registration authority and a certificate authority.

13. The method of claim 11, wherein the step of logging into the authentication server is accomplished by the end user via a browser client.

14. The method of claim 11,comprising the further step of first tagging each data item with at least one identifier that dictates access to the data item based upon a predefined set of schema constructs.

15. The method of claim 14, wherein each data item can be tagged at any level within a multi-level data structure.

16. The method of claim 15, wherein the level is selected from the group consisting of: a row of a database, a node in a hierarchical tree, a file, and a directory of files.

17. The method of claim 11, wherein the XML security schema includes a structure for defining a security profile and a community of interest profile.

18. The method of claim 17, wherein the security profile includes a security level and a set of caveats.

19. The method of claim 17, wherein the community of interest profile includes topics of interest.

20. A system for providing multi-level access to data items in a distributed network, comprising:

a web portal for providing access to data items, wherein each data item is tagged with at least one identifier that dictates access to the data item based upon a predefined set of schema constructs; and an authentication system for logging users into the web portal, wherein the authentication system is in communication with the web portal via a web services based communication framework, and wherein the authentication system includes:

a system for generating a set of XML credential data during a user login based on a predefined XML schema; and a system for passing the set of XML credential data to the web portal to determine access to tagged data items for the user.

21. The system of claim 20, wherein the predefined XML schema provides a mechanism for defining a community of interest profile for a community of users.

22. The system of claim 21, wherein the community of interest profile includes a security profile, a relationship profile, a source profile and an interest profile.

23. The system of claim 22, wherein the security profile includes level information and caveat information.

24. The system of claim 22, wherein the relationship profile includes membership information.

25. The system of claim 22, wherein the source profile includes geospatial information and security domain information.

26. The system of claim 22, wherein the interest profile includes interest data selected from the groups consisting of: area of interest, topic of interest, object of interest, region of interest, political region of interest, country of interest, and city of interest.

* * * * *